US012720033B2

(12) United States Patent
Briercliffe et al.

(10) Patent No.: US 12,720,033 B2
(45) Date of Patent: Aug. 25, 2026

(54) THREE DIMENSIONAL IMAGE GENERATION USING A CLOUD OF CAMERAS

(71) Applicant: Product Development Associates, Inc., Burnsville, MN (US)

(72) Inventors: Bradley Vernon Briercliffe, Hastings, MN (US); Steven Trellis, Hopkins, MN (US)

(73) Assignee: Product Development Associates, Inc., Burnsville, MN (US)

( * ) Notice: Subject to any disclaimer, the term of this patent is extended or adjusted under 35 U.S.C. 154(b) by 0 days.

(21) Appl. No.: 18/781,314

(22) Filed: Jul. 23, 2024

(65) Prior Publication Data

US 2026/0032227 A1 Jan. 29, 2026

(51) Int. Cl.

| | |
|---|---|
| ***G06T 7/593*** | (2017.01) |
| ***H04N 13/172*** | (2018.01) |
| ***H04N 13/194*** | (2018.01) |
| ***H04N 13/282*** | (2018.01) |
| ***H04N 13/293*** | (2018.01) |

(52) U.S. Cl.

CPC ......... *H04N 13/282* (2018.05); *H04N 13/172* (2018.05); *H04N 13/194* (2018.05); *H04N 13/293* (2018.05)

(58) Field of Classification Search

CPC .. H04N 13/282; H04N 13/172; H04N 13/194; H04N 13/293

See application file for complete search history.

(56) References Cited

U.S. PATENT DOCUMENTS

| | | | | |
|---|---|---|---|---|
| 6,380,970 | B1 * | 4/2002 | Minamikawa ....... | H04N 13/349 348/E13.043 |
| 9,479,768 | B2 * | 10/2016 | Yukich ................ | H04N 13/393 |
| 10,729,502 | B1 * | 8/2020 | Wolf ...................... | B66F 9/183 |
| 2017/0251143 | A1 * | 8/2017 | Peruch ................ | H04N 13/243 |
| 2018/0047208 | A1 * | 2/2018 | Marin .................. | G06T 15/506 |
| 2020/0098122 | A1 * | 3/2020 | Dal Mutto ............ | H04N 23/60 |
| 2020/0273581 | A1 * | 8/2020 | Wolf ..................... | G16H 40/63 |
| 2022/0030215 | A1 * | 1/2022 | Yano ................... | H04N 13/239 |

FOREIGN PATENT DOCUMENTS

| | | | | |
|---|---|---|---|---|
| WO | WO-2011013995 A2 * | 2/2011 | ............... | H04N 7/24 |
| WO | WO-2011093555 A1 * | 8/2011 | ............ | G06T 19/00 |

* cited by examiner

*Primary Examiner* — Howard D Brown, Jr.

(74) *Attorney, Agent, or Firm* — Mueting Raasch Group

(57) ABSTRACT

A device includes a receiver configured to receive a spectrum of data feeds, each data feed received from a camera of a plurality of disparate cameras disposed in a common region. A storage device includes a plurality of frames. A controller is configured to extract image data from each data feed of the plurality of data feeds, each data feed including one or more images. The controller stores each image of the one or more images in a frame of the plurality of frames, each frame associated with a respective data feed of the plurality of data feeds. The controller produces a three dimensional image by aggregating each of the images from the plurality of frames and stores the three dimensional image in the storage device.

15 Claims, 9 Drawing Sheets

THREE DIMENSIONAL IMAGE GENERATION USING A CLOUD OF CAMERAS

SUMMARY

Examples described herein involve a device, comprising a receiver configured to receive a spectrum of data feeds, each data feed received from a camera of a plurality of disparate cameras disposed in a common region. A storage device comprises a plurality of frames. A controller is configured to extract image data from each data feed of the plurality of data feeds, each data feed comprising one or more images. The controller stores each image of the one or more images in a frame of the plurality of frames, each frame associated with a respective data feed of the plurality of data feeds. The controller produces a three dimensional image by aggregating each of the images from the plurality of frames and stores the three dimensional image in the storage device.

A method involves receiving a spectrum of data feeds, each data feed received from a camera of a plurality of disparate cameras disposed in a common region. Image data is extracted from each data feed of the plurality of data feeds, each data feed comprising one or more images. Each image of the one or more images is stored in a frame of a storage device comprising a plurality of frames, each frame of the plurality of frames associated with a respective data feed of the plurality of data feeds. A three dimensional image is produced by aggregating each of the images from the plurality of frames. The three dimensional image is stored in the storage device.

The above summary is not intended to describe each embodiment or every implementation of the present disclosure. A more complete understanding will become apparent and appreciated by referring to the following detailed description and claims taken in conjunction with the accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

Figure 1A:
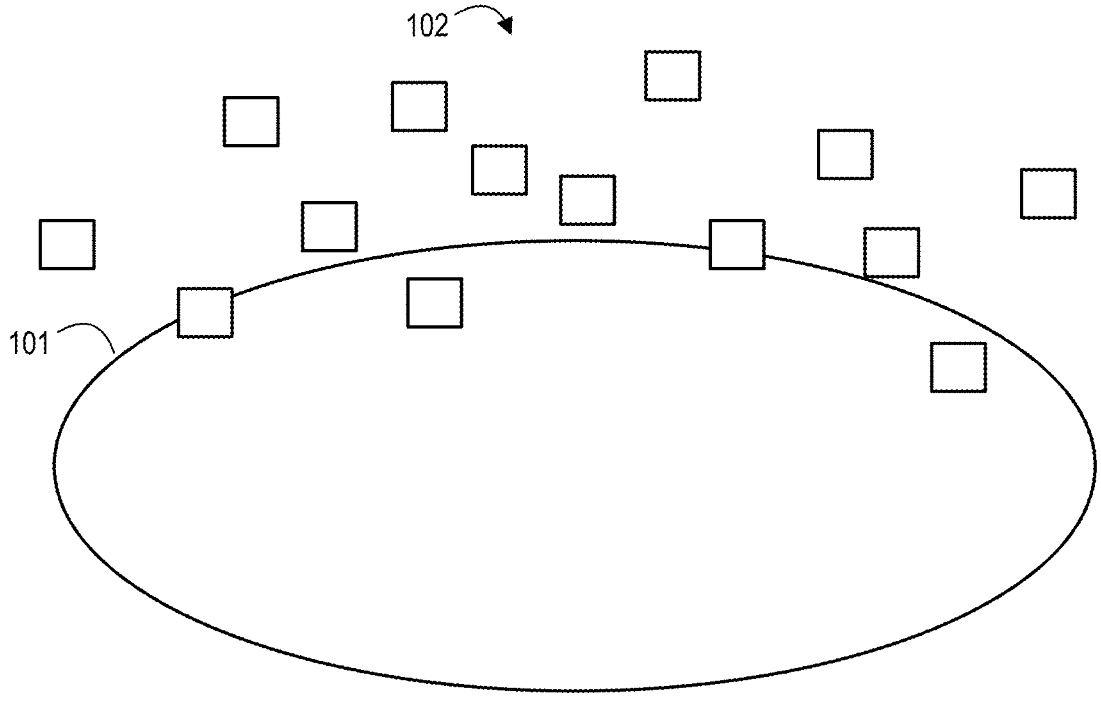
FIGS. 1A and 1B illustrate a plurality of part-carrying apparatuses deployed over a central region.
Figure 1B:
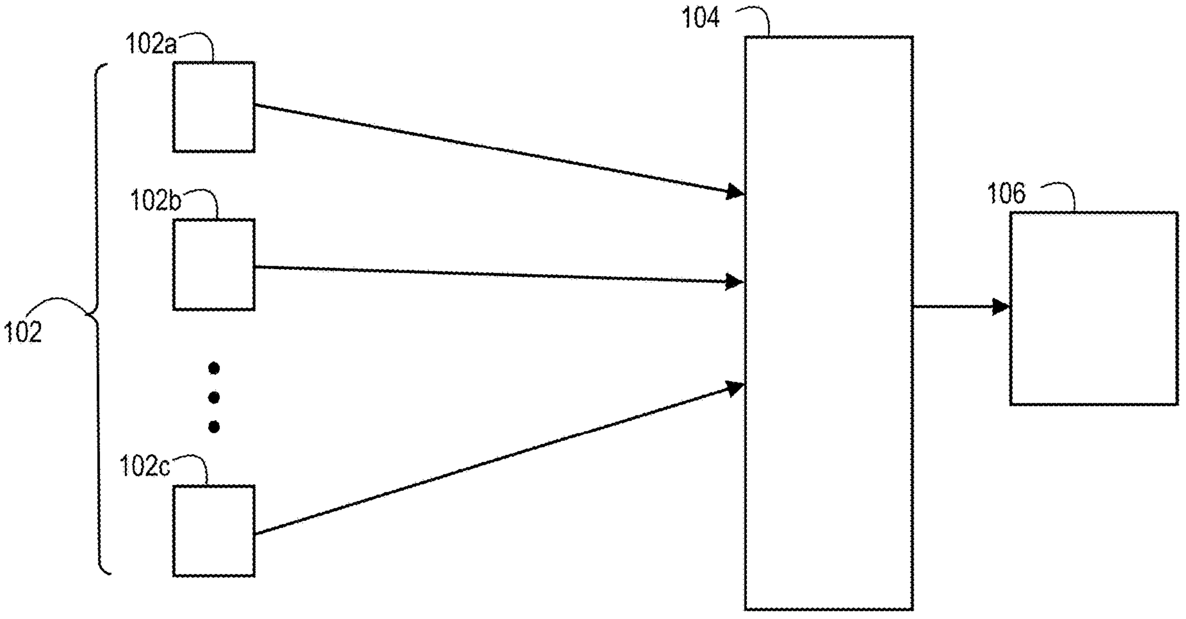

Situational awareness (knowing and tracking the locations of people and objects in a given area) during an emergency situation can mean the difference between a successful mitigation of a situation and a catastrophic result. These emergency events can be a result of natural catastrophe, unintended accident, or criminal endeavor, for example. The common factor across these events is the situation is chaotic, dynamic, and fast moving. The first responders responsible for managing the outcome of these events may benefit from reliable, real-time, visual information (situational awareness) so they can quickly assess and implement an appropriate set of actions. As the situation evolves, so does their plan. The more quickly the situation can be tracked, the more quickly the first responders can adapt and bring the event to a successful close; hopefully before events spiral out of control making a bad situation worse.

Embodiments described herein involves generating a three-dimensional image from information received from a plurality of a part-carrying apparatus (e.g., a camera-carrying apparatus) that provides first responders with real-time situational awareness enabling them to proactively mitigate an emergency situation. The current alternative is to simply react as best they can with whatever knowledge they have at the time; which may in fact be limited to what they can see with their own eyes. Because emergency events can occur anywhere at any time, it may be beneficial that the part-carrying apparatus be physically small, easily transportable, and rapidly deployable with a minimum-preferably none-advanced planning required. While examples described herein involve the use of a part-carrying apparatus to be used in emergency situations, it is to be understood that the part-carrying apparatus may be useful in a wide range of non-emergency applications as well. The part-carrying apparatus may be ballistically launched to obtain greater vertical range and may have intentionally slowed decent engaging turning of the apparatus by a structured device. If the cameras are sufficiently small, they will remain airborne for many seconds, which is enough time to generate a series of useful images before they fall out of operating range.

This 3D view is generated by a cloud of disparate cameras each simultaneously transmitting their unique field of view. A wide band receiver accepts all camera images simultaneously and passes all images into a photogrammetry engine which derives 3D content from a series of flat 2D images. Once generated, a presentation device displays this 3D image to the first responder. A 3D scrolling device could enable moving through the 3D image to obtain a better viewing angle of a given object of interest.

The cloud of cameras is deployed via an energetic launch vehicle which disperses the cameras into the air space above the region of interest. Because it is likely that some number of cameras will not be pointed in a useful direction, the receiver engine will need to sort camera feeds into a collection of useful and not-useful images. Only the useful images will be passed to the photogrammetry engine. The larger the number of cameras launched, the more accurate the output of the photogrammetry engine. However, the number of cameras also has an upper limit as the number of feeds directly drives the amount of computation needed to render the 3D image. Too many cameras could result in a significant delay in the presentation of the 3D image, minimizing the usefulness of the system. The “hang time” of the cameras (the amount of time they generate useful imagery) also impacts the total number of cameras required. Fewer cameras generating many images over a longer period is equivalent to a larger number of cameras operating over a shorter period of time. The important feature for the photogrammetry engine is that each image contains a slightly different viewing angle of the targets. It is irrelevant if the image comes from the same camera or a different camera. The cloud of cameras may be deployed such that at least some cameras are able to capture images at different angles and/or elevations relative to other cameras of the cloud of cameras.

FIG. 1A illustrate a cloud of part carrying apparatuses 102 disposed over an area of interest 101. Each part-carrying apparatus collects data from at least one camera. For example, each part-carrying apparatus may collect image data in a 360 degree circle around where the part-carrying apparatus is disposed. Many part-carrying apparatuses may be deployed in different locations around an area of interest 101 to capture as much information as possible about the area. For example, a number of part-carrying apparatuses deployed in the area of interest may be in a range of about 1 to about 5 units for typical applications or about 10 to about 50 units for applications requiring more content generation; where each unit contains multiple camera devices. These part-carrying apparatuses may be deployed by one or more first responders, for example.

Each part carrying apparatus 102*a*, 102*b*, 102*c* of the cloud of part carrying apparatuses 102 may transmit their unique field of view to a receiver 104 disposed at a base station. For example, each part-carrying apparatus 102*a*, 102*b*, 102*c* transmits its field of view simultaneously as at least one other part-carrying apparatus. In some examples, all of the deployed part-carrying apparatuses in the area of interest 101 may simultaneously transmit their data to the receiver 104. A controller 106 then processes the received data to create a three-dimensional image of the area of interest.

FIGS. 2-6 illustrate an example part-carrying apparatus in accordance with embodiments described herein. The part-carrying apparatus includes a base portion 111 and a shaft 120 extending from the base portion 111. The base portion may be any shape. For example, the base portion may be substantially cylindrical. In some examples, the base portion has one or more corners. The base portion 111 may not be a uniform shape and/or size throughout the entirety of the base portion 111. For example, the base portion may have a different cross-sectional width at a first surface 112 when compared to a second surface 114 opposite the first surface 112. The shaft 120 may be any shape. In various configurations, the shaft 120 may be substantially cylindrical allowing for rotation when the part-carrying apparatus is deployed. The part-carrying apparatus 110 including the base portion 111 and the shaft has a height, H, in a range of 10 millimeters to about 40 millimeters, or in a range of about 15 millimeters to about 30 millimeters. In some examples, the part-carrying apparatus 110 has a height in a range of 20 millimeters to about 25 millimeters.

Figure 2:
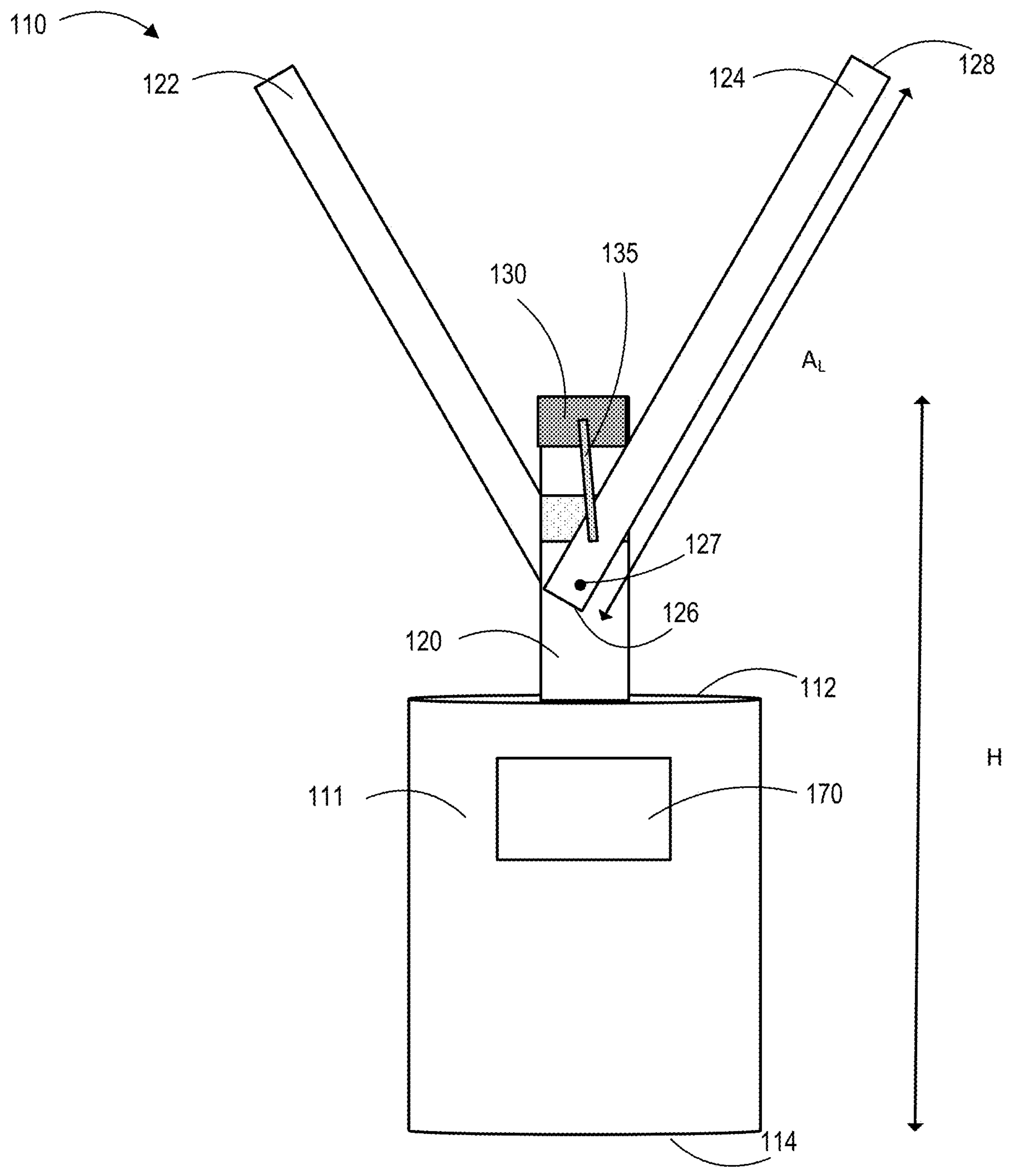
FIG. 2 illustrates an example part-carrying apparatus in accordance with various examples.

A first arm 122 and a second arm 124 are coupled to the shaft 120. The arms 122, 124 each are coupled to the shaft at one end at an attachment point. For example, the second arm 124 is coupled to the shaft 120 at a first end 126 at the attachment point 127. A second end 128 of the second arm 124 extends away from the shaft 120. The arms 122, 124 may be attached to the shaft 120 by any suitable mechanism. For example, the arms 122, 124 may be coupled to the shaft 120 using one or more metal stamping processes. The arms 122, 124 may be permanently attached or may be temporarily attached such that the arms 122, 124 can be removed when not in use. While the example shown in the figures herein shows a part-carrying apparatus having two arms, it is to be understood that more than two arms may be attached to the shaft 120. Each of the arms 122, 124 has a length, $A_L$, in a range of 10 millimeters to about 60 millimeters, or in a range of about 20 millimeters to about 40 millimeters. In some examples, each of the arms 122, 124 has a length in in a range of 30 millimeters to about 35 millimeters. While the arms 122, 124 shown in FIG. 2 are substantially the same length as each other, it is to be understood that the arms may be of unequal length.

One or more parts 170 may be coupled to the part-carrying apparatus. The part 170 may be configured to capture information about an environment around the part-carrying apparatus. For example, the part 170 may include one or more cameras and/or one or more microphones, for example. The part may include other components configured to facilitate the capturing, analysis and transmittal of the information captured by the cameras. For example, one or more storage devices may be configured to store the information collected by the cameras.

A transmitter may be configured to transmit the information collected by the cameras. In an example, a plurality of part-carrying apparatuses are configured to record images in a particular location from different perspectives. For example, the plurality of part-carrying apparatuses may be deployed in a location of an emergency such as a car crash, for example. The images and/or videos captured by each of the cameras may be transmitted to a central location where additional analysis and/or image aggregation may be performed. The analysis may be performed with input of a human operator. In some examples, at least some of the analysis is performed automatically, without input from a human operator. In some examples, all of the analysis is performed automatically and a collection of results are displayed via a display at the central location. In an example, the data from the plurality of part-carrying apparatuses is combined to produce a three dimensional image of the target area. In some examples, the part-carrying apparatus does not include a transmitter and the information may be manually retrieved from the part-carrying apparatus.

A locking nut 130 may be coupled to the shaft 120 and be configured to lock one or more of the arms 122, 124 in place in various conditions and will be described in more detail below. The locking nut 130 may include one or more protrusions 135. For example, there may be the same number of protrusions 135 as arms 122, 124 such that each protrusion is configured to couple the locking nut 130 to a respective arm. In the example shown in FIG. 2, the visible protrusion 135 couples the locking nut 130 to the second arm 124. The protrusion may be configured to exert pressure on the arms to lock them in place. The protrusion 135 may include any suitable material. For example, the protrusion 135 may include a string such as a Kevlar string.

According to various configurations, the part-carrying apparatus 110 is configured to be launched into the air using a launcher. The launcher includes a shell that acts as the launching system whether containing black power for ignition, compressed gas for quick pressure release, etc. This shell's purpose is to, in one form or another, launch the apparatus into the air to obtain greater height. The shell may remain in the launcher while the part-carrying apparatus 110 ascends. The shell may allow the operator to place the apparatus within the shell in a void and on top of the pressure wadding.

Figure 3:
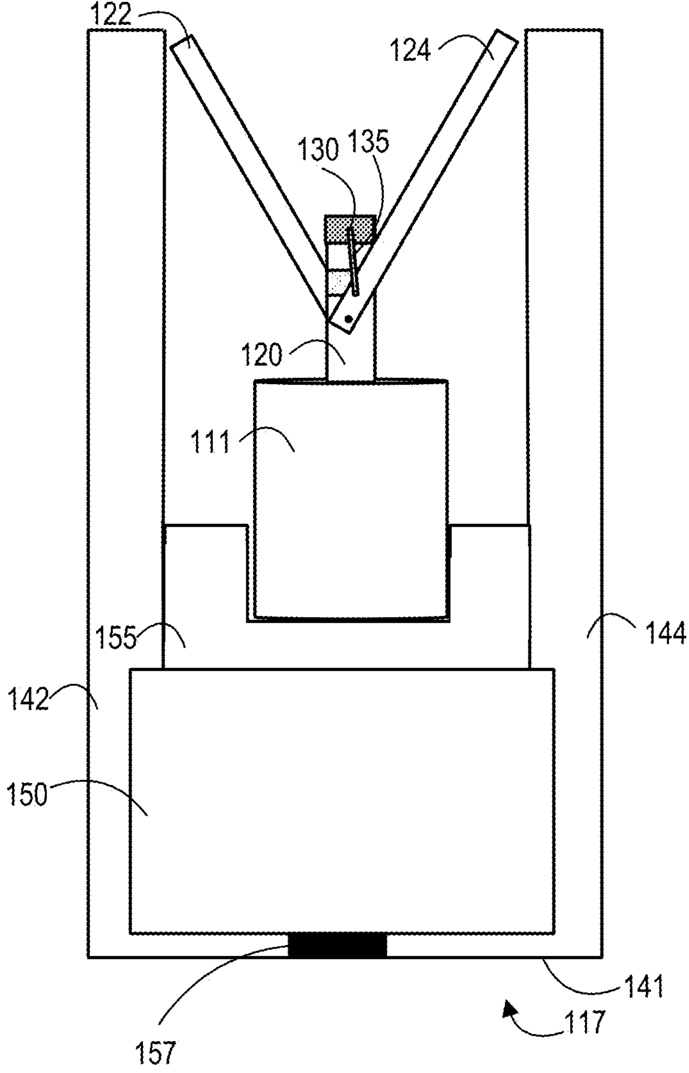
FIG. 3 illustrates the part-carrying apparatus disposed in a launcher in accordance with examples described herein.

FIG. 3 shows the part-carrying apparatus disposed in a launcher 117. The launcher 117 includes shell having a base 141, a first wall 142 and an opposing second wall 144 are coupled to the base 141 such that a cavity is formed by the base 141, the first wall 142, and the second wall 144. A pressure chamber 150 is disposed within the cavity proximate the base 141. A fill port 157 may be configured to allow for material to be added to allow for the initiation of the launch. For example, the fill port 157 may allow for the addition of black power or compressed gas, for example, to be added to the pressure chamber 150. The fill port may have a seal to prevent or slow leaks of the pressurized material from the pressure chamber 150. A pressure wad 155 is disposed between the part-carrying apparatus 110 and the pressure chamber 150. The pressure wad 155 protects the part-carrying apparatus 110 from the exploding pressure of the propellant in the pressure chamber 150.

In various examples, the part-carrying apparatus 110 is stowed in the launcher 117 before it is launched. For example, the arms 122, 124 may be attached to a rod with the locking nut 130 in the unlocked position while being stowed as illustrated in FIG. 3.

Figure 4:
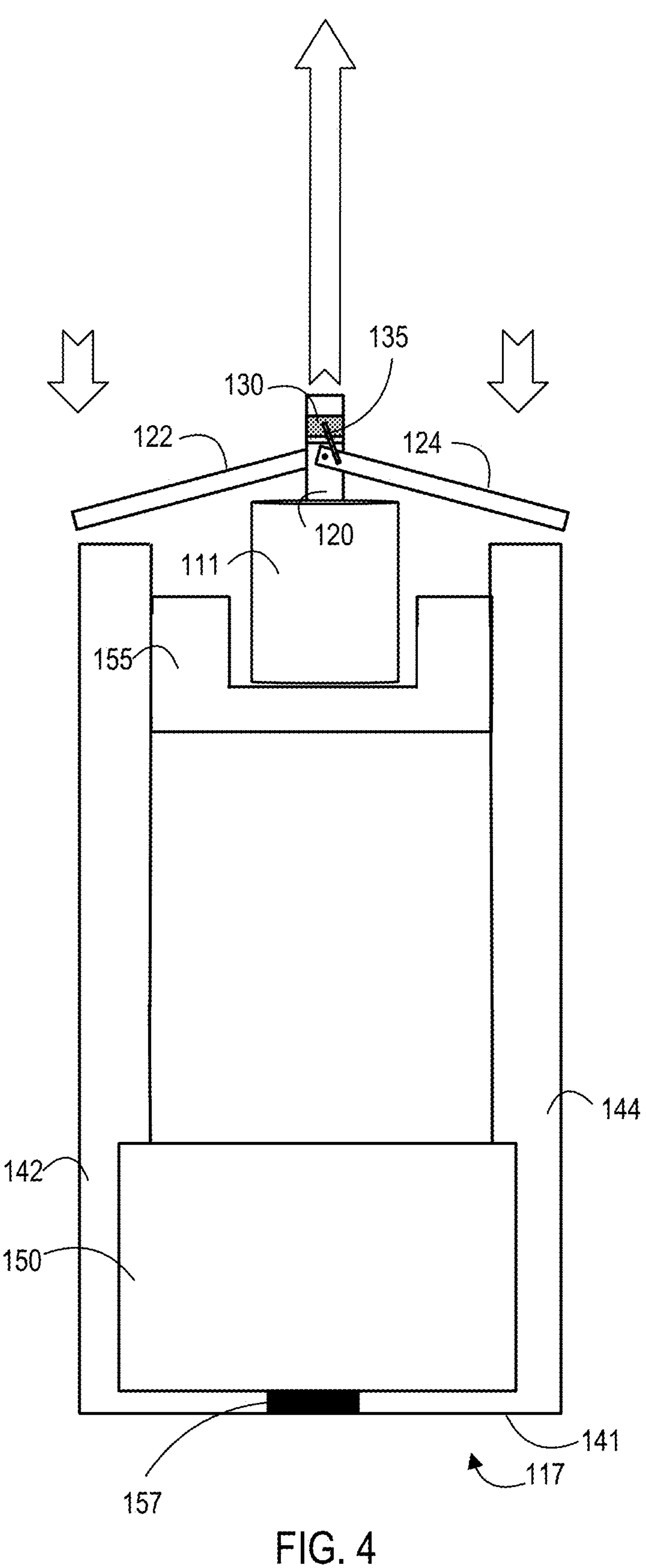
FIG. 4 illustrates a launch of the part-carrying apparatus in accordance with examples described herein.
Figure 5:
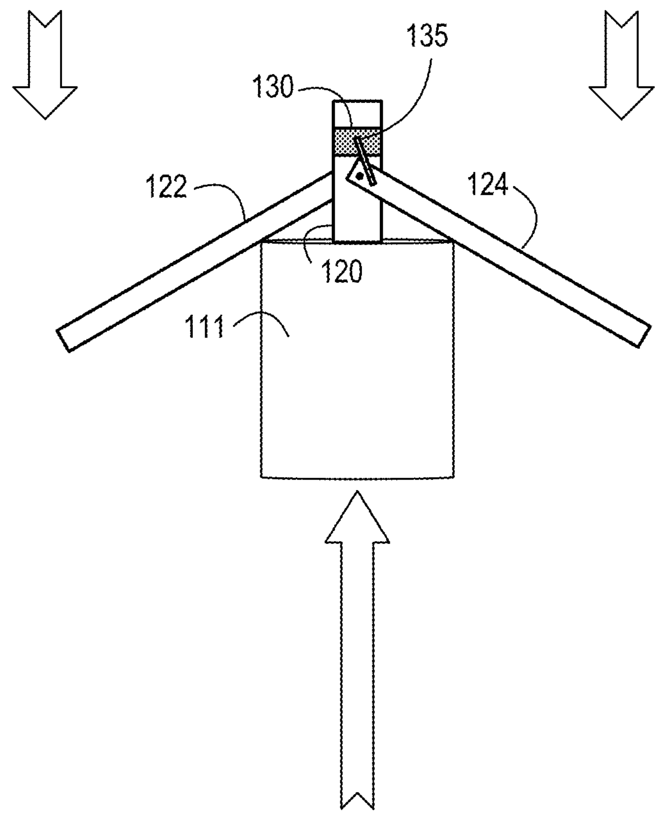
FIG. 5 illustrates the part-carrying apparatus after it has been launched into the air and is ascending in accordance with examples described herein.
Figure 5:
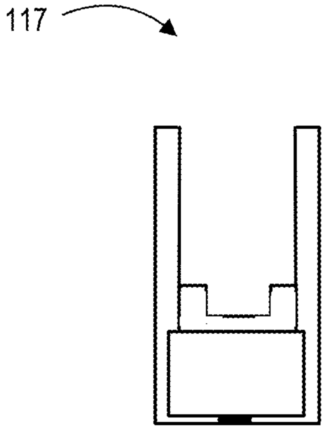

As the part-carrying apparatus 110 is being launched, the arms 122, 124 of the part-carrying apparatus 110 begin to fold onto the apparatus to help reduce drag on the apparatus to help obtain greater vertical height as shown in FIG. 4.

Figure 6:
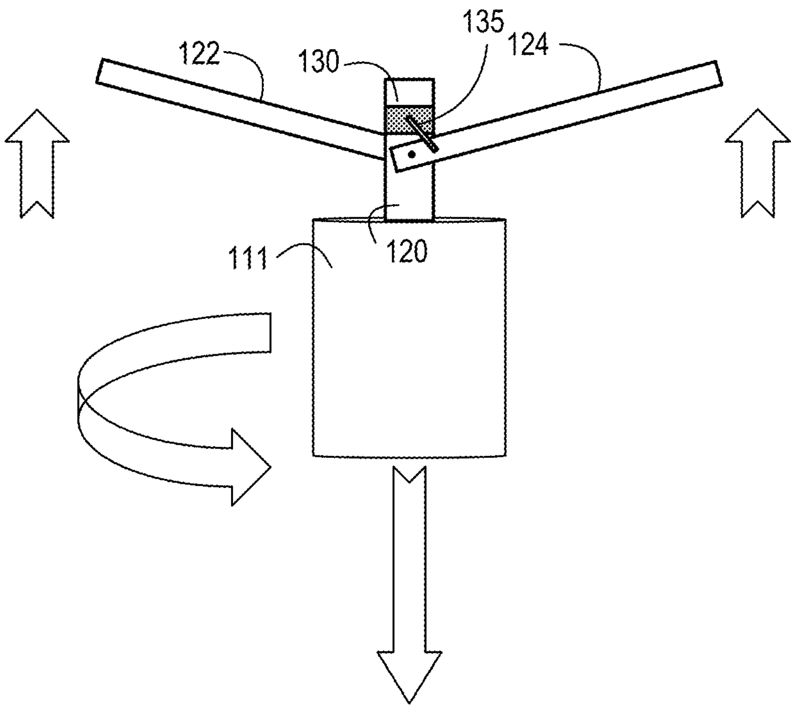
FIG. 6 illustrates the part-carrying apparatus when it is descending in accordance with examples described herein.
Figure 6:
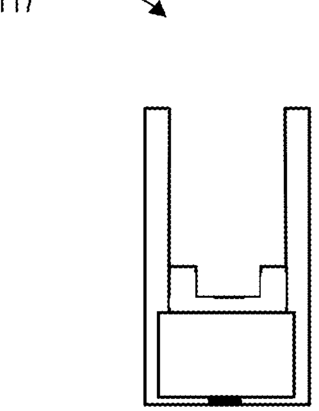

As the part-carrying apparatus 110, clears the shell and continues to ascend, the air resistance will push the arms down which will pull the locking nut 130 into a locked position to prevent the arms 122, 124 from going above a predefined latitude while the part-carrying apparatus 110 is descending. This downward fold is physically held down by the air resistance on top and limited also by the physical body of the part-carrying apparatus as shown in FIG. 4. When the apparatus reaches its apogee and begins to descend, as shown in FIG. 6, the arms 122, 124 will naturally, mechanically engage, which will engage the locking nut 130, to slow the apparatus's decent and turn the apparatus to engage a 360-degree turning sequence. This engagement is the level or upward fold and is physically engaged by and to the severity of the specific airfoil(s) of the mechanical arm(s) by generating lift to slow the descent of the apparatus. The physical limitation of the upward bounds of the arms 122, 124 is set by the locking nut 130 on top of the mechanical arms 122, 124. This turning sequence will allow the any cameras 170 on the part-carrying apparatus 110 to obtain a clear 360-degree view of the surroundings. While FIGS. 2-6 show an example of a part-carrying apparatus and deployment mechanism, it is to be understood that other types of data collecting apparatuses may be used. In some examples, data from different sources is collected at different times and then aggregated together rather than collecting data from the different sources simultaneously.

Figure 7:
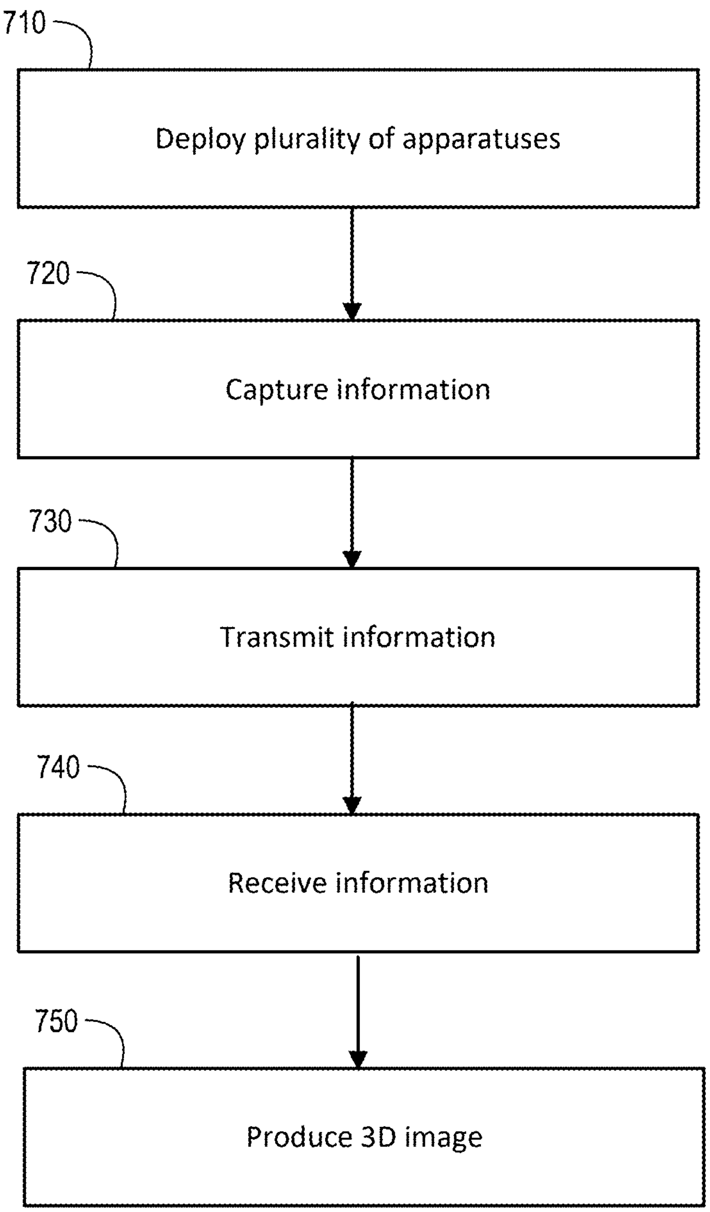
FIG. 7 illustrates a process for producing a compound image from information retrieved from a plurality of part-carrying apparatuses in accordance with examples described herein.

FIG. 7 illustrates a process for producing a compound image (for example, a 3D image) from information retrieved from a plurality of part-carrying apparatuses in accordance with examples described herein. The plurality of part-carrying apparatuses are deployed 710. They may be deployed using a ballistic launcher as described in further detail herein. In some examples, the part-carrying apparatus may be ballistically launched with an intentional, mechanically driven slowed descent using the arms and the locking nut as shown in FIGS. 2-6.

Information around each of the part-carrying apparatuses is captured 720 by each of the part-carrying apparatuses. According to various examples, the information includes images captured in a location around each of the part-carrying apparatuses while they are deployed.

The information is transmitted 730 from each of the part-carrying apparatuses is transmitted to a central location such as a base station, for example. The information from each of the part-carrying apparatuses is received 740 at the base station. The information may include one or more images. Each image may be stored in a frame of a storage device having a plurality of frames. A three dimensional image is produced 750 by aggregating each of the images from the plurality of frames.

Figure 8:
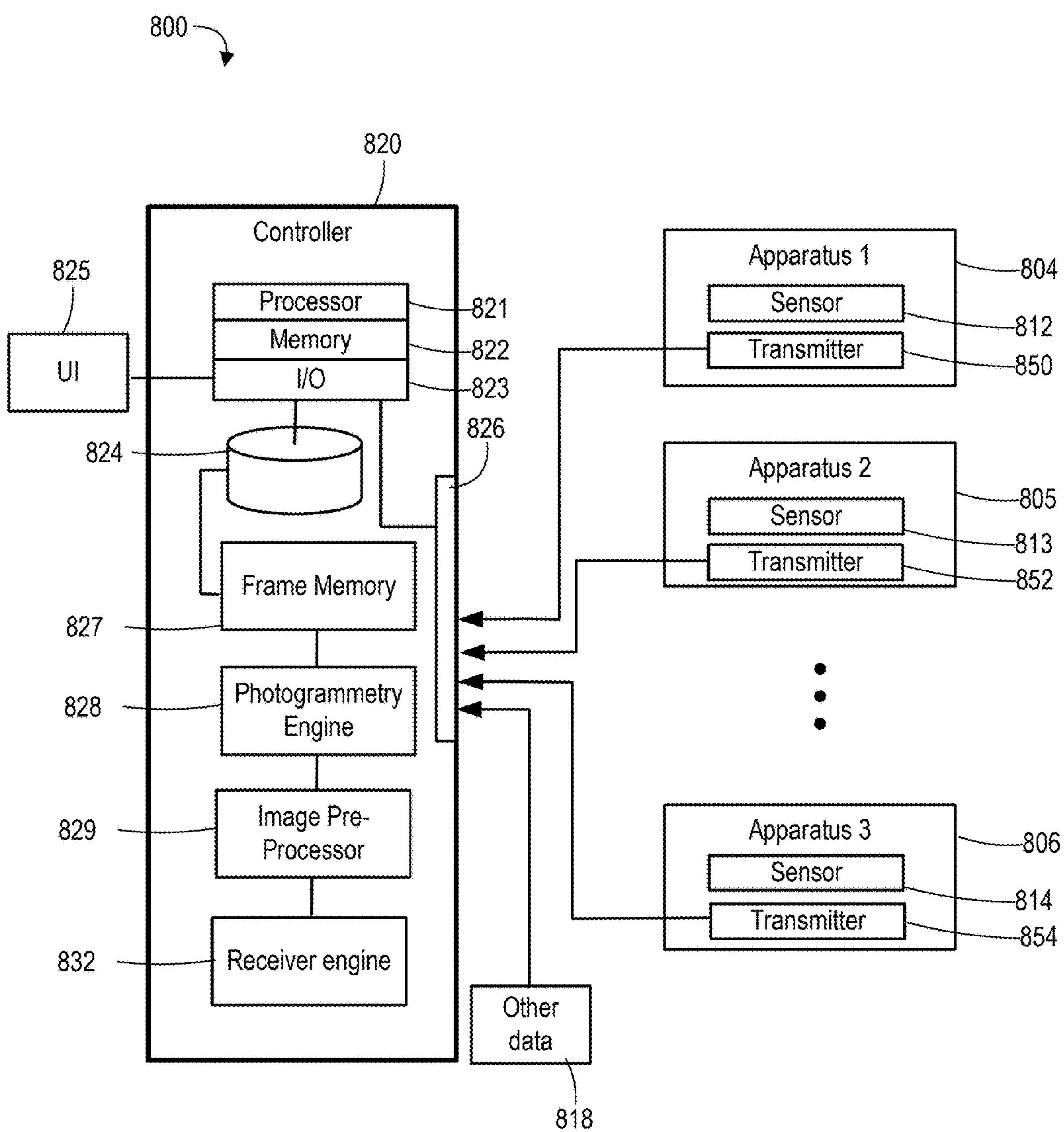
FIG. 8 illustrates a block diagram of a system and apparatus configured to perform the methods described herein.

The methods and processes described above can be implemented on computer hardware, e.g., workstations, servers. In FIG. 8, a block diagram shows a system and computing apparatus 800 that may be used to implement methods according to an example embodiment (e.g., as a computer, a mobile device, a control system, etc.). The components may be implemented as integrated circuits (ICs), portions thereof, discrete electronic devices, or other modules, instruction sets, programmable logic or algorithms, hardware, hardware accelerators, software, firmware, or a combination thereof, or as components otherwise incorporated within a chassis of a larger system.

One or more part-carrying apparatuses 804, 805, 806 that collect information about a surrounding area are included. The apparatuses 804, 805, 806 may include various electrical and/or mechanical components of a self-contained system and may be discrete from other apparatuses.

Each of the apparatuses 804, 805, 806 is associated with sensors 812, 813, 814 configured to collect information and transmitters 850, 852, 854 that transmit the information to a central location be fed into a controller 820.

The sensors 812, 813, 814 may be described as either vision-based sensors or non-vision-based sensors. Vision-based sensors may include cameras that are capable of recording images and/or videos, for example. Non-vision-based sensors may include temperature sensors, optical sensors, humidity sensors, motion sensors, temperature sensors, for example. The vision-based sensors or cameras may be calibrated to a human-visible spectrum. In some examples, the cameras may be calibrated to one or more other types of spectrums such as infra-red, near-infra red, or any other spectrum that may be useful based on the application. In some examples, the user or first responder is able to select the one or more desired spectrums before or during deployment of the apparatus. In some examples, one or more of the apparatuses 804, 805, 806 may respond to a different spectrum or set of spectrums than at least one other one of the apparatuses 804, 805, 806. For example, some apparatuses may be calibrated to respond to a visual spectrum and some other apparatuses may be calibrated to respond to an infra-red spectrum.

According to various examples, other types of sensors may be embedded in devices that collect data and communicate over the internet or grant mobile access for device management. Technologies include low energy wireless, Bluetooth, near field communication (NFC), long-term evolution (LTE), ZigBee, other wireless protocols, etc.

Data collected by the sensors 812, 813, 814 may be transmitted to a controller 820. The controller 820 may include conventional computing hardware such as a central processor 821, memory 822, input/output (I/O) interfaces 823, and a non-volatile data storage unit 824 (e.g., hard disk drives, solid state drives). The processor 821 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 821 may include multiple components, such as any combination of one or more microprocessors, one or more controllers, one or more DSPs, one or more ASICs, and/or one or more FPGAs, as well as other discrete or integrated logic circuitry. The functions attributed to the controller 820 and/or processor 821 herein may be embodied as software, firmware, hardware, or any combination of these. Certain functionality of the controller 820 may also be performed in the cloud or other distributed computing systems operably connected to the processor 821. It is to be understood that the computing devices described herein may be a set of computing devices that are communicatively coupled via a cloud-based system, for example. For example, controller 820 can be a system of multiple controllers that operate together in a cloud-based system.

The memory 822 may include any volatile, non-volatile, magnetic, optical, and/or electrical media, such as a random-access memory (RAM), read-only memory (ROM), non-volatile RAM (NVRAM), electrically erasable programmable ROM (EEPROM), flash memory, and/or any other digital media. While shown as both being incorporated into the controller 820, the memory 822 and the processor 821 could be contained in separate devices.

The controller 820 includes a receiver 826 that receives data from the sensors 812, 813, 814 and produces outputs that can be acted on via a user interface 825 that communicates sensor information to a user. The receiver 826 may be a wide band receiver that accepts data from the apparatuses 804, 805, 806 simultaneously. In some examples, at least some of the data may be received serially. Each apparatus 804, 805, 806 is allocated a unique operating frequency band (channel) within a given spectrum. To minimize the spacing between the bands, the amount of data transmitted from each camera may be minimized. For example, the data may be transmitted using a simple run length encoded set of pixels with marker data. The marker data may include a start of frame and a start of line marker. These markers may be embedded within the stream. By changing the number of bits of data sent per pixel, the optimal data rate—and therefore frequency band width—can be selected. In some examples, the data rate may be selected by an operator of the apparatuses 804, 805, 806. In some cases, the optimal frame rate may be automatically selected based on a default frame rate and/or a specific application. In various examples, the data is not s sent as traditional National Television Standards Committee (NTSC) or Advanced Television Standards Committee (ATSC) because these formats may include more content that may not be needed to transmit the images and thus decrease the frame rate unnecessarily.

A receiver engine 832 can be optimized to identify and extract imagery data from each data feed from each of the apparatuses 804, 805, 806. The receiver engine 832 passes the incoming spectrum of camera feed channels through a series of band-pass filters to isolate feeds from the different camera. Each camera may be associated with a unique frequency and thus there may be one band-pass filter for each camera channel. Once the channel feeds have been isolated, the raw imagery data can be extracted, and each image can be recreated.

Each image from the plurality of image feeds may be stored within a frame memory 827 within the storage device 824. Each frame is associated with a single apparatus 804, 805, 806. Each frame memory is sufficiently large to accommodate the maximum number of potentially transmitted images from a given channel.

An image pre-processor 829 may be used to determine images that are not useful for the photogrammetry engine 828 to create the three-dimensional image. Not useful images may include substantially duplicate images and/or images that are not of the area of interest. All of the images from an apparatus may be discarded if it is determined that the apparatus is not in a correct location and/or is not otherwise working properly. In some examples, an operator may assist the image pre-processor 829 in the determination of which images are not useful. For example, the image pre-processor 829 may flag images or groups of images that may not be useful and an operator makes the final decision of whether to send the images to the photogrammetry engine 828. In some examples, the image pre-processor 829 operates completely independently from the operator.

As soon as at least some of the images are complete within the frame memory 827, a photogrammetry engine 828 coupled to the controller 820 derives the three-dimensional content from the series of flat two-dimensional images stored in the frame memory 827. The photogrammetry engine 828 may continue to process in parallel while images are being received and stored in frame memory 827. In some examples, the photogrammetry engine 828 processes the images after all of the images from all of the apparatuses 804, 805, 806 have been stored in the frame memory 827. Once at least one of the feeds complete transmission, the photogrammetry engine 828 may produce a 3D image that aggregates all of the received two-dimensional images. The photogrammetry engine aggregates the images by using 3D geometry. The process starts by the engine isolating objects within the 2D image array (pictures) and finding the same object in other pictures. This process is known as point matching. Once the object has been isolated in multiple pictures, the process of triangulation is used to estimate the distance to the object from the camera for the given image. Eventually a large data set of object/distance pairs are created. This set is then sorted into a 3D map and the associated object image is overlaid at that distance.

The completion of transmission may be determined based on a predetermined timeout period after a last transmission. In some examples, it is determined that a transmission of the data feed for a particular camera has ended based on a predetermined total amount of time that the apparatus 804, 805, 806 has been deployed. The final three-dimensional image may be produced upon a determination that a majority of the apparatuses 804, 805, 806 have stopped transmitting. In some examples, the final three-dimensional image is produced upon a determination that all of the apparatuses 804, 805, 806 have stopped transmitting. The output three-dimensional image may be presented to an operator via a display in the user interface 825, for example.

In some examples, additional information such as external data 818 may be received by the receiver 826. The external data 818 may include global-positioning system (GPS) coordinates, satellite imagery, and/or other sources of relevant information. This external data 818 may be overlaid with the image data and/or the compound three-dimensional image.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A device, comprising:

a receiver configured to receive a spectrum of data feeds, each data feed received from a camera of a plurality of disparate cameras disposed in a common region, wherein each data feed is received on a unique operating frequency band within the spectrum of data feeds;

a storage device comprising a plurality of frames; and a controller configured to:

extract image data from each data feed of the plurality of data feeds, each data feed comprising one or more images, wherein each data feed comprises a run length encoded set of pixels and marker data including one or both of a start of a frame marker and a start of a line marker;

pass the spectrum of data feeds through a series of band-pass filters to isolate each data feed;

store each image of the one or more images in a frame of the plurality of frames, each frame associated with a respective data feed of the plurality of data feeds;

producing a three dimensional image by aggregating each of the images from the plurality of frames; and storing the three dimensional image in the storage device.

2. The device of claim 1, wherein the controller is configured to operate in a parallel with the receiver as the spectrum of data feeds is received.

3. The device of claim 1, wherein the three dimensional image is overlaid with additional information.

4. The device of claim 3, wherein the additional information comprises one or more of global positioning system (GPS) coordinates, satellite images, and time.

5. The device of claim 1, further comprising a display configured to display the three dimensional image.

6. The device of claim 1, wherein the plurality disparate cameras are positioned at a plurality of different angles relative to other cameras of the plurality of disparate cameras within the common region.

7. The device of claim 1, wherein the plurality of disparate cameras are positioned at a plurality of different elevations relative to other cameras of the plurality of disparate cameras within the common region.

8. A method, comprising:

receiving a spectrum of data feeds, each data feed received from a camera of a plurality of disparate cameras disposed in a common region, wherein each data feed is received on a unique operating frequency band within the spectrum of data feeds;

extracting image data from each data feed of the plurality of data feeds, each data feed comprising one or more images, wherein each data feed comprises a run length encoded set of pixels and marker data including one or both of a start of a frame marker and a start of a line marker;

pass the spectrum of data feeds through a series of band-pass filters to isolate each data feed;

storing each image of the one or more images in frame of a storage device comprising a plurality of frames, each frame of the plurality of frames associated with a respective data feed of the plurality of data feeds;

producing a three dimensional image by aggregating each of the images from the plurality of frames; and storing the three dimensional image in the storage device.

9. The method of claim 8, further comprising overlaying the three dimensional image with additional information.

10. The method of claim 9, wherein the additional information comprises one or more of global positioning system (GPS) coordinates, satellite images, and time.

11. The method of claim 8, displaying the three dimensional image.

12. The method of claim 8, wherein the plurality disparate cameras are positioned at a plurality of different angles relative to other cameras of the plurality of disparate cameras within the common region.

13. The device of claim 1, wherein each camera is associated with a unique frequency, and wherein the series of band-pass filters includes one band-pass filter for each camera channel.

14. The device of claim 1, wherein, after the data feeds are isolated, raw imagery data is extracted from each data feed and each image is recreated based on the raw imagery data.

15. The device of claim 1, further comprising an image pre-processor configured to determine images that are not useful for creation of the three dimensional image, the images that are not useful comprising one or more of substantially duplicate images and images that are not of an area of interest.

* * * * *